United States Patent
Haase et al.

(10) Patent No.: US 7,235,781 B2
(45) Date of Patent: Jun. 26, 2007

(54) LASER SYSTEM FOR THE IONIZATION OF A SAMPLE BY MATRIX-ASSISTED LASER DESORPTION IN MASS SPECTROMETRIC ANALYSIS

(75) Inventors: Andreas Haase, Bremen (DE); Markus Kayser, Bremen (DE); Jens Höhndorf, Bremen (DE); Armin Holle, Oyten (DE)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 11/226,855

(22) Filed: Sep. 14, 2005

(65) Prior Publication Data
US 2006/0071160 A1    Apr. 6, 2006

(30) Foreign Application Priority Data
Sep. 14, 2004    (DE) ............... 10 2004 044 196

(51) Int. Cl.
*H01J 49/00* (2006.01)
(52) U.S. Cl. ............................................. 250/288
(58) Field of Classification Search .......... 250/288, 250/281, 282, 423 P
See application file for complete search history.

(56) References Cited

U.S. PATENT DOCUMENTS 5,365,063 A    11/1994    Kaesdorf et al.
6,956,208 B2 *  10/2005    Reilly et al. ............... 250/288
2003/0025074 A1    2/2003    Li
2003/0155499 A1    8/2003    Axelsson

FOREIGN PATENT DOCUMENTS

| DE | 198 34 070 A1 | 7/1998 |
| DE | 101 12 386 A1 | 3/2001 |
| GB | 2 149 569 A | 6/1985 |
| WO | WO 01/93308 A3 | 12/2001 |
| WO | WO 2005/079360 A2 | 9/2005 |

OTHER PUBLICATIONS

Rohrbacher et al., "Multiple-ion-beam time-of-flight mass spectrometer", Review of Scientific Instruments, vol. 72, No. 8, American Institute of Physics, pp. 3386-3389, 2001.
Dreisewerd, Klaus, "The Desorption Process in MALDI", Chemical Reviews, pp. A-AE, 2002.

* cited by examiner

*Primary Examiner*—Kiet T. Nguyen
(74) *Attorney, Agent, or Firm*—Law Office of Paul E. Kudirka

(57)    ABSTRACT

The invention relates to a laser system for the ionization of a sample by matrix-assisted laser desorption in mass spectrometric analysis. The invention consists in providing a laser system which generates a spatially modulated intensity distribution with intensity spots on the sample, which significantly improves the quality and the robustness of the mass spectrometric analysis compared with a spatially homogeneous intensity distribution and, in particular, improves the ionization efficiency and, for a time-of-flight mass spectrometer with axial injection, the mass resolution and the signal-to-noise ratio.

22 Claims, 10 Drawing Sheets

LASER SYSTEM FOR THE IONIZATION OF A SAMPLE BY MATRIX-ASSISTED LASER DESORPTION IN MASS SPECTROMETRIC ANALYSIS

FIELD OF THE INVENTION

The invention relates to a laser system for the ionization of a sample by matrix-assisted laser desorption in mass spectrometric analysis.

BACKGROUND OF THE INVENTION

In the last 10 to 15 years, two methods have prevailed in mass spectrometric analysis for soft ionization of biological macromolecules: Matrix-assisted laser desorption/ionization (MALDI), and electrospray ionization (ESI). The biological macromolecules under analysis will be termed analyte molecules below. With the MALDI method, the analyte molecules are generally prepared on the surface of a sample support in a solid matrix, whereas with the ESI method they are dissolved in a liquid. Both methods have a considerable influence on the mass spectrometric analysis of biological macromolecules in genomics, proteomics and metabolomics; their inventors were awarded the Nobel prize for chemistry in 2002.

In a prepared MALDI sample, there are $10^3$ to $10^5$ times as many matrix molecules as there are analyte molecules, and they form a polycrystalline matrix in which the analyte molecules are integrated, either scattered in the interior of the crystals or at their grain boundaries. The prepared MALDI sample is briefly irradiated with a laser pulse, which is strongly absorbed by the matrix molecules. The pulsed irradiation causes the matrix to be explosively transferred from the solid aggregate state into the gaseous phase of a vaporization cloud (desorption). The analyte molecules are usually ionized by being protonated or deprotonated in reactions with matrix ions, the analyte ions being predominantly singly charged after leaving the vaporization cloud. The degree of ionization of the analyte molecules is only some $10^{-4}$. The term soft ionization is used when an analyte molecule is transferred in isolation into the gaseous phase and ionized, without suffering a dissociation.

Despite the linear absorption by the matrix, matrix-assisted laser desorption/ionization is a nonlinear process, which for pulsed laser radiation with a duration of a few nanoseconds only begins above an intensity threshold of around $10^6$ watts per square centimeter. For soft ionization, the maximum intensity lies at an upper limit of approximately $10^7$ watts per square centimeter. With a typical laser pulse duration of around ten nanoseconds, the stated intensity limits produce a fluence of between 10 and 100 millijoules per square centimeter.

The MALDI process is complex and affected by numerous factors, some of which are interdependent. Since the MALDI method was first published in 1988, many parameters have been investigated and varied. In spite of this, the processes in the matrix and in the vaporization cloud which lead to the ionization of the analyte molecules are still not completely understood and are still being intensely researched (K. Dreisewerd, Chem Rev. 103 (2003), 395-425: "The Desorption Process in MALDI").

The chemical parameters of the MALDI process, for example the matrix substances themselves, the concentration ratios between matrix and analyte molecules and the preparation conditions, have been comprehensively researched. For analyte molecules of different chemical substance classes, such as proteins or nucleic acids, over one hundred different chemical matrix substances have been elucidated, such as sinapic acid, DHB (2,5-dihydroxy benzoic acid), CHCA (α-cyano-4-hydroxy cinnamic acid) or HPA (3-hydroxypicolinic acid). The matrix substances exhibit strong absorption in the wavelength range between 330 and 360 nanometers. A MALDI sample can be prepared in a number of different ways, for example with the "dried droplet" preparation or the "thin layer" preparation. In dried droplet preparation, the matrix substance is dissolved together with the analyte molecules in a solvent, applied to a sample support and then dried. In thin layer preparation, on the other hand, the matrix substance is applied to the sample support without analyte molecules and dried. A solution with analyte molecules is then applied to the thin polycrystalline matrix, causing the latter to be partially dissolved again, and the analyte molecules are integrated into the matrix during the subsequent drying. As far as the physical parameters of the MALDI process are concerned, it has, until now, been chiefly the temporal duration of the laser pulses, the intensity in the laser focus and the wavelength of the pulsed laser beam which have been considered.

For commercially available mass spectrometers with MALDI, pulsed laser systems in the ultraviolet spectral range (UV) are predominantly used nowadays. A number of laser types and wavelengths are available: nitrogen lasers ($\lambda$=337 nm), excimer lasers ($\lambda$=193 nm, 248 nm, 308 nm) and Nd:YAG lasers ($\lambda$=266 nm, 355 nm). Only the nitrogen laser and the Nd:YAG laser at a wavelength of 355 nanometers are of interest commercially for the MALDI method, and the nitrogen laser is far and away the one most frequently used. The laser medium of the nitrogen laser and the excimer laser is a gas or a gas mixture, whereas with the Nd:YAG laser it is a YAG (yttrium aluminium garnet: $Y_3Al_5O_{12}$) crystal doped with neodymium ions. With the Nd:YAG laser, the strongest laser line, at a wavelength of 1,064 nanometers, is transformed into the stated wavelengths in nonlinear optical crystals. The duration of the laser pulses used in the MALDI method is typically between 1 and 20 nanoseconds in the UV; in the academic field, however, pulse durations in the region of picoseconds have also been used.

For the MALDI method, laser systems which emit in the infrared spectral region (IR): Er:YAG ($\lambda$=2.94 µm) and CO2 ($\lambda$=10.6 µm) are also occasionally used for research purposes. Whereas with the UV-MALDI method the matrix molecules are supplied with energy via excited electronic states, in the IR-MALDI method it is oscillations of the matrix molecules that are excited. The pulse duration of the IR laser systems in the IR-MALDI method are between 6 and 200 nanoseconds. In contrast to the UV-MALDI method, both solid matrices and liquid matrices, for example glycerine, are used in the IR-MALDI method.

A laser system usually comprises a laser medium, an energy input for the excitation of the laser, an optical resonator and optical and electrooptical components to shape the laser beam. In the following, a laser system is understood to be the complete set-up comprising optical, electrical and electrooptical components which are necessary to generate and shape the laser beam from the laser medium to the location of the MALDI sample. The components for beam formation can be located both inside the optical resonator, in the vicinity of the laser medium and also outside the optical resonator. These types of components include lenses, mirrors, active and passive Q-switches for pulse generation, coupling and decoupling into and out of an optical fiber, and nonlinear optical crystals. To those skilled in the art it is apparent that not all the components mentioned have to be used in the various laser systems, and that they can be supplemented by further components.

The laser systems used in the MALDI method differ not only in their wavelength but also in their spatial beam profile. For solid-state lasers such as the Nd:YAG laser or the Er:YAG laser, the laser medium is a crystal doped with ions. The laser medium is located in an optical resonator, which ensures that the spatial beam profile consists of a transverse basic mode or a few transverse modes. The radial intensity distribution of the transverse basic mode corresponds to a Gaussian function and is rotationally symmetric to the direction of propagation of the laser beam. A laser beam like this can be focused to a minimum diameter which is limited only by the diffraction.

The nitrogen laser at a wavelength of 337 nanometers is far and away the most frequently used type of laser in the MALDI method, this wavelength being the most intensive laser line of the nitrogen laser. The laser medium used is gaseous nitrogen, which is excited by means of an electrical discharge between two electrodes. Since the most intensive laser line exhibits a high amplification, a laser pulse can decrease the population inversion of the energy states even if it sweeps the electrodes only once. Even when using cavity mirrors, many transverse modes are superimposed in the beam profile of the nitrogen laser, with the result that the minimum diameter of a laser focus in commercial nitrogen lasers at a wavelength of 337 nanometers is only around three micrometers. The typical diameter of the area irradiated in MALDI applications is around 20 to 200 micrometers. The beam profile of the nitrogen laser has an almost flat top at the electrodes, the width and height of the beam profile being determined by the separation or the height of the discharge electrodes. The repetition rate of the laser pulses in the nitrogen laser is limited to around 100 hertz unless provision is made for a rapid gas exchange. Nitrogen lasers with a typical repetition rate of 50 hertz are used for MALDI applications.

In practice, the electrical gas discharge in the nitrogen laser is not the same at every point between the electrodes, and it generates a spatially inhomogeneous amplification profile which does not even out during the short time the laser is in action, but instead transfers to the beam profile of the nitrogen laser. The nitrogen laser thus has a spatially modulated flat-top beam profile with intensity maxima and minima which is imaged onto the sample or focused onto it. Furthermore, a pulsed gas discharge is normally difficult to reproduce, so that the intensity distribution in the beam profile and the energy fluctuate from laser pulse to laser pulse. According to the prior art, the MALDI method strives for an intensity distribution with maximum spatial homogeneity on the sample. If this is generated over a wide area, the inhomogeneities of the prepared MALDI sample, as occur, for example, with an uneven distribution of the analyte molecules in the matrix, are averaged out. The immanently present inhomogeneities in the beam profile of the nitrogen laser do, however, lead to the intensity distribution on the sample being spatially modulated and exhibiting undesirable intensity maxima.

The pulsed solid-state lasers used until now in the MALDI method typically have a beam profile which comes very close to a single Gaussian mode. If a pulsed laser beam is focused or imaged onto the sample, then there is a Gaussian intensity distribution with a single maximum at the location of the sample. With solid-state lasers in the UV, the half-width, at which the intensity of the maximum has fallen off to half the value, can theoretically be less than one micrometer, but in MALDI applications it is around 20 to 200 micrometers. Even if laser pulse repetition rates of several hundred kilohertz are possible in principle with solid-state lasers, most current MALDI applications work with a repetition rate of up to 200 hertz. The energy fluctuations from laser pulse to laser pulse are typically less in the case of solid-state lasers than with nitrogen lasers.

According to the prior art, the objective is a spatially homogeneous intensity distribution on the sample. In order to obtain a homogeneous intensity distribution on the sample with the Gaussian beam profile of a solid-state laser, the beam profile can be spatially homogenized by propagation in an optical fiber and then imaged onto the sample. To facilitate this, the laser beam is coupled into an optical fiber in which a plurality of transverse fiber modes with differing radial intensity distributions can propagate (multimode fibers). The propagation of the coupled laser beam in the multimode fiber means that energy is transferred out of the Gaussian mode into a plurality of transverse fiber modes which are superimposed at the output of the optical fiber. If the temporal coherence of the laser beam used is sufficiently low or the multimode fiber is sufficiently long, the intensity distribution at the fiber output is given by the sum of the intensity distributions of the individual transverse fiber modes. The plurality of transverse fiber modes with differing radial intensity profiles thus results in a homogeneous intensity distribution at the fiber output. If the output of the multimode fiber is now imaged, a flat-top intensity distribution is also obtained on the sample. This method of homogenizing the beam profile can also be used with the nitrogen laser to minimize the immanent inhomogeneities in the beam profile.

With some MALDI mass spectrometers the laser beam is imaged or focused onto the sample through a metal grid, which acts as an ion focusing system with which the ions are drawn out of the vaporization cloud. Since this ion focusing system must permit a high transmission rate of the ions generated in the MALDI process, the open areas of the metal grid are so large, compared with the bar area, that they have little effect on the homogeneous intensity distribution on the sample.

The quality of a mass spectrometric analysis is generally determined by the following parameters: The mass accuracy, the mass resolution, the detection power, the quantitative reproducibility and the signal-to-noise ratio. This means that the quality of a mass spectrometric analysis increases if at least one parameter is improved and the other parameters do not deteriorate as a result. The mass accuracy includes both a systematic deviation of the measured average ion mass from the true ion mass (mass trueness or rather the deviation from mass trueness) as well as the statistical variance of the individual measured values around the mean of the ion mass (mass precision). The mass resolution determines which ion masses in the mass spectrometric analysis can still be distinguished. In practice, however, it is not only the quality but also the robustness of the mass spectrometric analysis that is important. A mass spectrometric analysis is robust if its quality changes little when the measuring parameters, for example the energy of the laser pulses or the preparation conditions of the MALDI sample, are varied.

The ion signal of a mass spectrometer with MALDI is proportional to the ionization efficiency, to the desorbed sample volume and to the concentration of the analyte molecules in the sample. The ionization efficiency is given by the number of analyte ions which can be evaluated, divided by the number of analyte molecules in the desorbed sample volume, i.e. the percentage of the analyte molecules from the sample volume removed by the laser irradiation which is available as ions for a mass spectrometric analysis. If analyte molecules are already present in the matrix in an ionized form before the desorption process, the number of analyte molecules is increased by the number of analyte ions present which are already ionized. Since the desorbed sample volume can be relatively easily increased by the irradiated sample area and by the fluence, the ionization efficiency represents an important parameter for the optimization of the MALDI process. A high ionization efficiency facilitates a high detection power because a maximum ion signal at low concentration (or low sample utilization) is achieved. With a typical degree of ionization of only $10^{-4}$ it is possible to considerably improve the MALDI process. The definition of the ionization efficiency of the MALDI process also takes into account the losses which arise as a result of a fragmentation of analyte molecules during the transfer into the gaseous phase and which therefore reduce the number of analyte ions which can be evaluated.

For the mass spectrometric analysis of the analyte ions generated in the MALDI process, both conventional sector field mass spectrometers and quadrupole mass spectrometers as well as quadrupole ion trap mass spectrometers and ion cyclotron resonance mass spectrometers are possible in principle. Particularly suitable, however, are time-of-flight mass spectrometers with axial injection, which require a pulsed current of ions to measure the time of flight. In this case, the starting time for the time of flight measurement is predetermined by the ionizing laser pulse. The MALDI process was originally developed for use in a vacuum. In more recent developments, matrix-assisted laser desorption/ionization is also used at atmospheric pressure (AP MALDI). Here, the ions are generated with a repetition rate of up to 2 kilohertz and fed, with the help of an ion guide, to a time-of-flight mass spectrometer with orthogonal ion injection (abbreviated OTOF), a quadrupole ion trap mass spectrometer or an ion cyclotron resonance mass spectrometer. In an OTOF mass spectrometer, the ions generated in the MALDI process can be fragmented and stored before the measurement of the time of flight with an electronic pulsed injection is commenced.

With specific MALDI applications, the intensity on the sample is increased to such a degree that the ions generated have enough intrinsic energy to dissociate. Depending on the time between the generation of the ions and their dissociation, this is termed a decay within the ion source (ISD or "in source decay") or outside the ion source (PSD or "post source decay").

Moreover, there are also imaging mass spectrometric analytical methods (IMS or "imaging mass spectrometry"), in which the MALDI process is used to generate the ions. With IMS, a thin section of tissue obtained, for example, from a human organ using a microtome, is prepared with a matrix substance and mass spectrometrically analyzed after being spatially resolved. The spatial resolution of the mass spectrometric analysis can be done either by scanning individual spots of the tissue section or by stigmatic imaging of the ions generated. With the scanning method, the pulsed laser beam is focused onto a small diameter on the sample, and a mass spectrum is measured for each individual pixel. A one- or two-dimensional frequency distribution is produced for individual proteins from the plurality of individual spatially-resolved mass spectra. With stigmatic imaging, an area of up to 200 by 200 micrometers is irradiated homogeneously with a laser pulse. The ions generated in this way are imaged ion-optically pixel by pixel onto a spatially-resolving detector. Until now it has only been possible to scan the frequency distribution of one ion mass with a single laser pulse because spatially resolving ion detectors that operate fast enough are not available. The measured ion mass can be varied from laser pulse to laser pulse, however.

SUMMARY OF THE INVENTION

The basis of the invention presented here is the completely surprising realization that the quality and robustness of a mass spectrometric analysis can be significantly improved if the spatial intensity distribution of the laser beam on the sample is not homogeneous but instead is spatially modulated by small intensity spots or sharp intensity edges or both. If the analyte ions generated are analyzed in a time-of-flight mass spectrometer with axial injection, then, in particular, both the ionization efficiency and the mass resolution and even the signal-to-noise ratio can be considerably increased compared to a spatially homogeneous intensity distribution, while the other parameters remain at least constant. Thus, overall, the quality is significantly improved. A plurality of intensity spots or intensity edges mean that there is at the same time an averaging of the ion signals over the irradiated area, whereby preparative inhomogeneities of the MALDI sample can also be compensated.

An intensity edge is defined as a linear intensity distribution where the intensity on the line exhibits a maximum in at least one direction, as in a straight line focus, for example. The maxima of an intensity edge can generally lie on any curve, however. In an intensity spot, the intensity falls off in all directions. The maximum of an intensity spot or the maxima of an intensity edge are not to be understood in the strict mathematical sense, however. A maximum is therefore not necessarily one individual spot on the sample, it can also be a flat-top area on which the intensity takes on the maximum value.

In complete contrast to the prior art, the spatial modulation of the laser beam is thus increased in laser systems according to the invention. It will be apparent to those skilled in the art that this can be done in a plurality of ways.

On the one hand, a laser system according to the invention can incorporate a device which spatially modulates the beam profile of a single laser beam. In the optical system, the beam profile is described by the spatial distribution of the intensity and the phase in a plane perpendicular to the direction of propagation (transverse distribution), the phase being less intuitive to understand and more difficult to measure compared to the intensity. For the description of the phase, a phase term is split off in the paraxial approximation of the wave optics, and this phase term varies rapidly in the direction of propagation. Without this phase term, the transverse distribution of the intensity and the phase along the direction of propagation only changes slowly.

The intensity in the beam profile can be modulated by a mask, for example, which either completely or partially absorbs, reflects or scatters the laser beam at a number of points, so that the beam profile has new intensity maxima and minima behind the mask. The phase of the beam profile can be spatially modulated by a transparent mask, for example, whose thickness is not uniform, so that the beam profile experiences a position-dependent phase shift. The spatial modulation in the profile of a laser beam can be increased both by generating new maxima or minima and also by increasing the degree of modulation of the existing maxima. The degree of modulation M is defined as $M=(Max-Min)/(Max+Min)$, where Max is the value of the intensity or the phase in a maximum, and Min is the value of the intensity or the phase in the adjacent minimum.

A device which increases the spatial modulation in the beam profile of a laser beam can be located at any point in the laser system, for example: at the laser medium, within the optical resonator, between the optical resonator and the sample, directly at the sample itself or in the region which is responsible for the excitation of the laser action. If the device is located within the optical resonator, then the laser beam generated can have a plurality of intensity maxima if the device means that the lasing in higher cavity modes is preferred or the lasing in the basic mode is suppressed.

On the other hand, a plurality of laser beams can be generated in a laser system according to the invention by using more than one laser medium or by splitting a single laser beam into several partial beams using beam splitters, for example. If these multiple laser beams are spatially recombined on the sample, an intensity distribution can be generated there, which is spatially modulated and which comprises a plurality of intensity spots and also intensity edges.

A spatially modulated intensity distribution of the laser beam on the sample can be either totally or partially adjustable, resulting in a plurality of new physical parameters, such as the number, the half-width, the intensity and the degree of modulation of the intensity spots or the intensity edges. In addition, the intensity in the regions between the intensity spots and intensity edges can be adjusted. The important thing here is that most of the parameters can be adjusted independently of each other. The half-width of the intensity spots and intensity edges is the width at which the intensity of a maximum has fallen to half the value.

These parameters of the intensity distribution can be used to optimize the quality and robustness of the mass spectrometric analysis if, for example, different analyte molecules are analyzed or the type of sample preparation is changed. In MALDI applications with ISD or PSD, in which the analyte molecules are not only ionized but also fragmented, the parameters of the spatial intensity distribution can be used to optimize both the fragmentation as well as the ionization efficiency, with good resolution and good signal-to-noise ratio, independently of each other.

The stigmatic imaging in imaging mass spectrometric analytical methods can also benefit from a laser system according to the invention because the greater ionization efficiency increases the quantity of analyte ions generated on the irradiated surface. If, in addition, the positions of the intensity spots or intensity edges on the sample are known, the resolved detector signal can be assigned to a location on the sample.

With the IR-MALDI method, a laser system according to the invention can signify an undreamed-of improvement since, until now, laser types with an almost Gaussian mode have been used exclusively here, and therefore the intensity distribution on the sample is probably not sufficiently spatially modulated for an effective MALDI process.

BRIEF DESCRIPTION OF THE DRAWINGS

The above and further advantages of the invention may be better understood by referring to the following description in conjunction with the accompanying drawings in which:

In FIG. 4a the intensity distribution on the sample of FIG. 2 corresponds to the regular grid of intensity spots in FIG. 3; in FIG. 4b, on the other hand, the intensity distribution on the sample is spatially homogeneous;

DETAILED DESCRIPTION

FIGS. 1a to 1d schematically illustrate four different intensity distributions on the MALDI sample in cross-section. On the ordinates, the intensity of the laser beam along one direction on the MALDI sample is represented in each case. Since FIGS. 1a to 1d only show the intensity as cross-sections along one direction, the intensity maxima shown can belong to individual intensity spots as well as to one or more intensity edges.

Figure 1A:
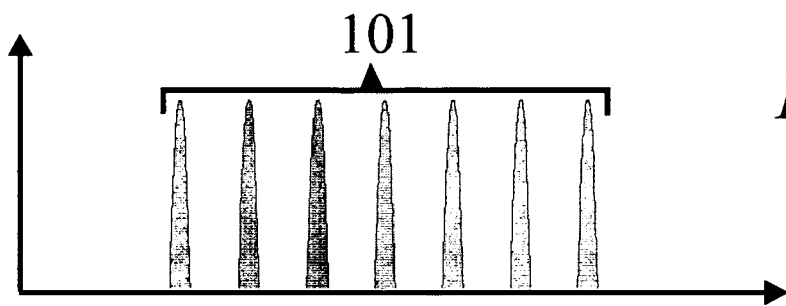
FIGS. 1a to 1d schematically illustrate various spatial intensity distributions on a MALDI sample in cross-section.

FIG. 1a illustrates maxima (101) which all have the same intensity and half-width. The separation between neighboring maxima is much larger than the half-width of the maxima. Since, in addition, the intensity in the regions between the maxima (101) disappears, this results in a degree of modulation of unity here.

Figure 1B:
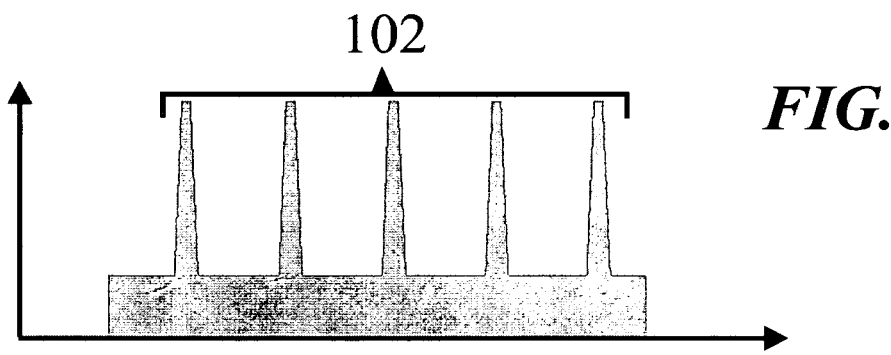

The intensity of the maxima and the separation between the maxima is larger in FIG. 1b than in FIG. 1a. The half-width of the maxima (102) corresponds exactly to the half-width of the maxima (101). The degree of modulation of the maxima (102) amounts to only ⅗, since the intensity in regions between the maxima (102) has a constant background and does not disappear, as in FIG. 1a. Furthermore, the intensity in the maxima (102) has a flat-top profile, whereas the intensity in the maxima (101) is at its maximum at precisely one point in each case.

Figure 1C:
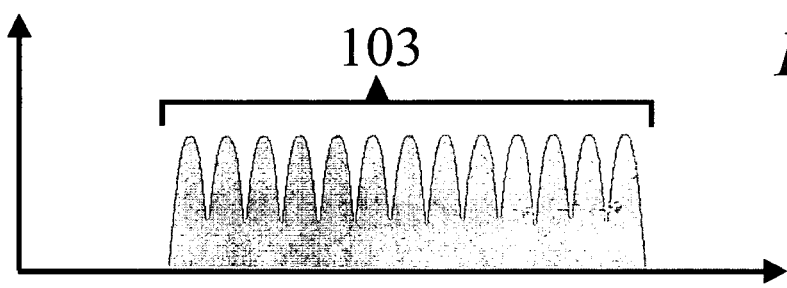

FIG. 1c shows maxima (103) which have a larger half-width compared to the maxima (101) and (102). The ratio between the separation and the half-width of neighboring maxima is much smaller here compared to the FIGS. 1a and 1b. The degree of modulation of the maxima (103) is ½.

Figure 1D:
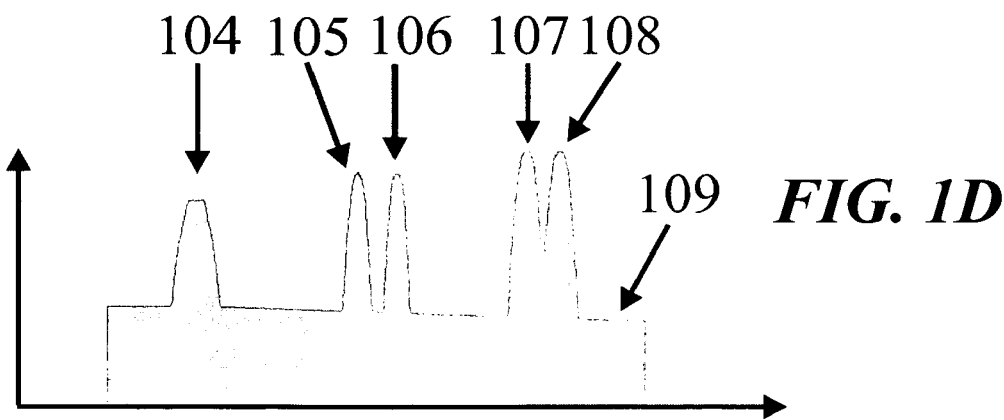

In FIG. 1d, the maxima (104) to (108) are, in contrast to the maxima in FIGS. 1a to 1c, irregularly distributed. There is a background (109), but it is not constant. The maxima differ in their half-width, their intensity and their separation from the neighboring maxima. In contrast to the maxima (105) to (108) the maximum (104) has a flat-top maximum with a degree of modulation of ⅓. The degree of modulation of the two maxima (105) and (106), and also the maxima (107) and (108), is ⅖ or ³/₁₀ respectively.

Figure 2:
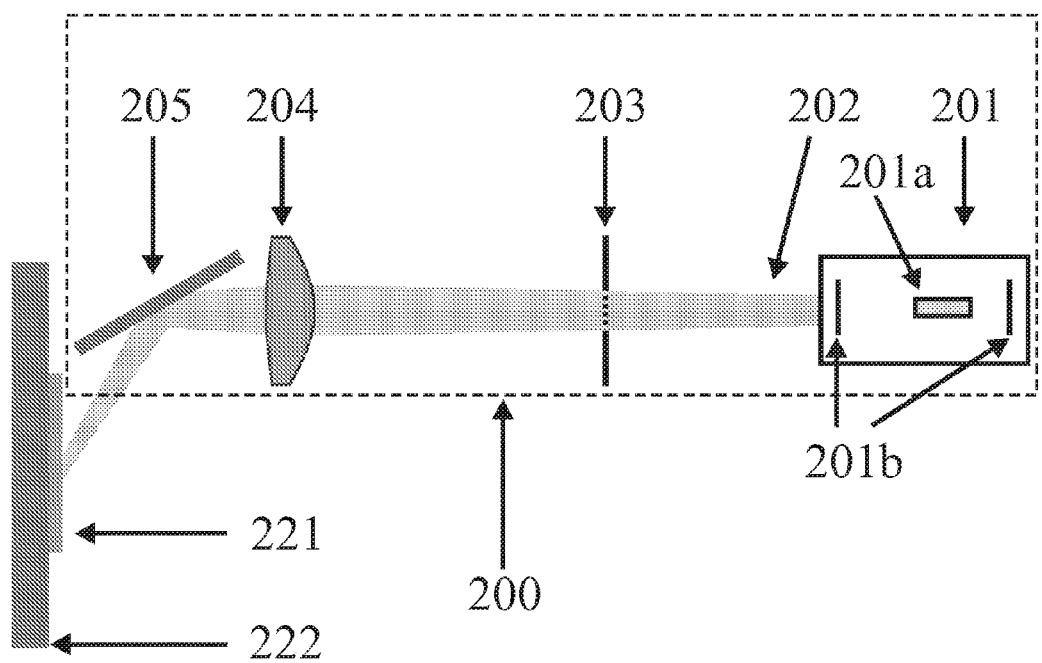
FIG. 2 shows the schematic representation of a laser system (200) according to the invention, in which the intensity in the beam profile is spatially modulated by a grid-shaped mask (203)

FIG. 2 illustrates a first embodiment of a laser system (200) according to the invention for matrix-assisted laser desorption/ionization in schematic representation. The laser beam (202) is generated in the schematically represented laser unit (201) so as to be temporally pulsed. The set-up required to excite the laser, the laser medium 201a itself, an optical resonator 201b and a variable energy attenuator are located in the laser unit (201). The laser beam (202) illuminates the grid-shaped mask (203), which has a structure comprising orthogonally arranged grid bars within a square aperture. The grid-shaped mask (203) is completely impermeable to the laser beam (202) outside the square aperture and on the grid bars, and increases the spatial modulation of the intensity in the beam profile according to the invention. The lens (204) images the grid-shaped mask (203) via the tilting mirror (205) onto the sample (221).

Together with other samples not shown, the sample (221) is prepared on a sample support (222) and contains the analyte molecules integrated into a solid matrix. If the threshold intensity for the MALDI process on the sample (221) is exceeded, the explosive evaporation of the matrix begins. The analyte molecules are transferred with the matrix into the gaseous phase and a certain proportion of them are present as analyte ions in the vaporization cloud. The tilting mirror (205) spatially separates the laser system (200) from the mass spectrometer (not shown), making it easier to transfer the ions generated in the MALDI process into the mass spectrometer.

For this and all the following embodiments, the type of laser medium is not critical for the present invention, and all wavelengths suitable for the MALDI process can be used equally well. Neither are there any limitations with respect to other chemical and physical parameters, such as the pulse duration, the matrix substance or the preparation of the MALDI sample, or the type of analyzing mass spectrometer.

The lens (204) and the tilting mirror (205) correspond to a projector which projects a reduced image of the grid-shaped mask (203) onto the sample (221), where it generates an intensity distribution which corresponds to the transmission on the mask (203). For those skilled in the art it is easy to see that, apart from the grid-shaped mask (203), any other masks can be used where the transmission can take on a value between zero and almost one at every point on the mask. One advantage of this embodiment consists precisely in the fact that any spatially modulated intensity distribution with intensity spots or intensity edges can be generated on the sample (221) by selecting the transmission accordingly at every point on the mask. The transmission can be adjusted for every point on the mask if the mask is manufactured using microlithographic methods or by the point-by-point exposure of light-sensitive film material, for example.

Instead of the grid-shaped mask (203), which is illuminated and partially transilluminated by the laser beam (202), the laser beam (202) can, of course, also illuminate a reflective surface, which is imaged onto the sample (221). There are various types of electrooptical chips comprising a plurality of individual pixels, which are arranged in a two-dimensional or linear array and can be individually electronically controlled, for example the DMD technology ("digital mirror device") from Texas Instruments or the LCoS technology ("liquid crystal on silicon") from Philips. With both of these electrooptical chips, the reflecting power can be selected as desired for each individual pixel.

In this preferred embodiment, the spatial intensity distribution on the sample (221) does not have to be constant; it can also be varied in order to optimize the ionization efficiency or the resolution for different conditions, for example. With a mechanical set-up, such as a slide or film projector, for example, many masks can be used in the laser beam and thus various spatially modulated intensity distributions can be generated on the sample (221), and several masks can be illuminated and imaged simultaneously. The electrooptical chips can be used to vary the spatial intensity distribution on the sample, by purely electronic means, without mechanical movement.

Important parameters of the spatial intensity distribution are the quantity, the half-width and the degree of modulation of the intensity spots and intensity edges, on the one hand, and the intensity in the intensity spots, in the intensity edges and in the regions in between, on the other hand. The half-widths of the intensity spots and intensity edges here are preferably less than fifty micrometers, and it is particularly preferred if they are less than twenty micrometers, but they can also be less than five micrometers, or even less than one micrometer. The degree of modulation is preferably greater than ³/₁₀ and it is particularly preferred if it is greater than ½, but it can also be greater than ⅘.

Within a spatially modulated intensity distribution, the sample (221) may not be uniformly ionized at all points. This can lead to the sample (221) being ionized to only a small degree, or even not at all, at some points. In order to use up a sample (221) as completely as possible with a sequence of laser pulses, it can be necessary to change the location or the position of the spatially modulated intensity distributions relative to the sample (221), or to vary the spatial intensity distribution itself. The spatially modulated intensity distribution can, for example, be shifted or turned relative to the sample (221) in the course of a sequence of laser pulses by mechanically moving the mask (203), the lens (204), the tilting mirror (205) or the sample support (222). If a lens system is used instead of the lens (204), it is also possible to vary the linear magnification. It is also possible to generate analyte ions from the samples which are located next to the sample (221) on the sample support (222).

If the sample (221) is illuminated obliquely, the image of the mask (203) on the sample (221) can be blurred and distorted. Methods are known from photography which can compensate for these aberrations, for example by tilting the lens (204) and the mask (203) towards the optical axis.

For those skilled in the art it is apparent that imaging can be realized by a plurality of different optical systems, for example by so-called phase contrast methods, where the spatial modulation of the phase is transformed into an intensity contrast. The intensity distribution on the sample (221) is spatially modulated even if the imaging conditions are not fulfilled exactly, for example if the image plane does not coincide with the location of the sample (221), for example, or the mask (203) is not located in the object plane. In the event of a deviation from the imaging conditions, it is, in principle, possible to predict the intensity distribution generated on the sample (221), but it is made more difficult.

Figure 3:
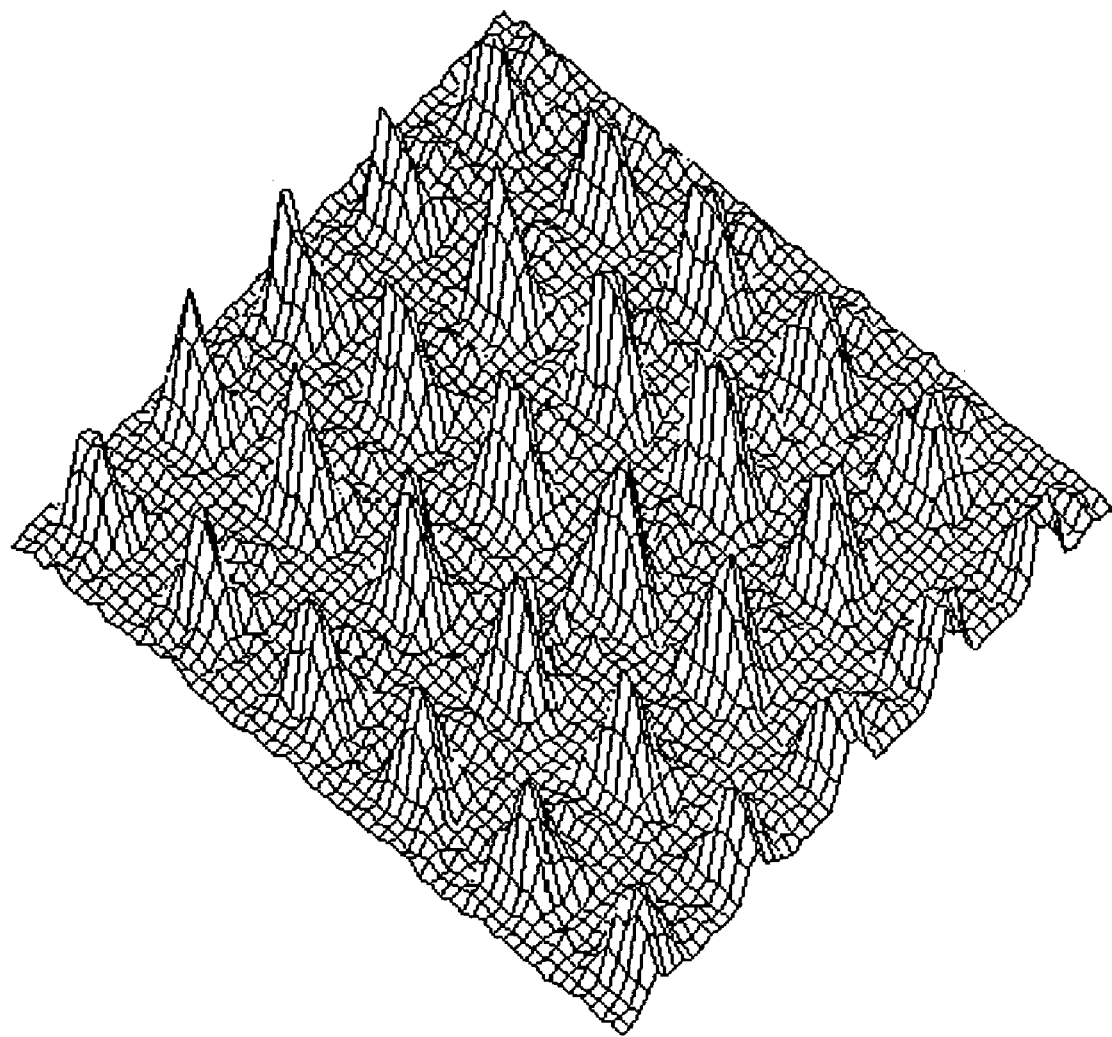
FIG. 3 illustrates an intensity distribution measured on the sample generated by the laser system of FIG. 2 with the help of the grid-shaped mask and comprising a regular grid of individual intensity spots.

FIG. 3 shows a measured intensity distribution generated on a sample (221) with a laser system according to the invention. The laser used here is a frequency-tripled, pulsed Nd:YAG laser with a wavelength of 355 nanometers and a pulse duration of around 3 nanoseconds, which has a Gaussian beam profile and illuminates the grid-shaped mask (203).

In this embodiment, the grid-shaped mask (203) has an almost square aperture with an edge length of around 720 micrometers. The grid bars are around 120 micrometers wide in both directions and form transparent apertures with an edge length of 60 micrometers. A six-fold reduction in size of the grid-shaped mask (203) produces a regular grid consisting of 30 intensity spots with a half-width of ten micrometers on the sample (221). The spatially modulated intensity distribution thus has an edge length of only around 150 micrometers on the sample (221), so that the analyte ions generated can be analyzed by an axial time-of-flight mass spectrometer with low losses and high resolution. The modulation of the intensity spots here is almost complete, i.e. the degree of modulation is almost unity. The edges of the intensity spots are steeper than shown in FIG. 3 as a result of the limited optical resolution of the measuring set-up. The Gaussian beam profile of the laser beam (202) has a half-width of around 4 millimeters at the location of the grid-shaped mask (203) so that, with an edge length of less than one millimeter, the illumination of the square diaphragm is spatially homogeneous to a good approximation.

Figure 4A:
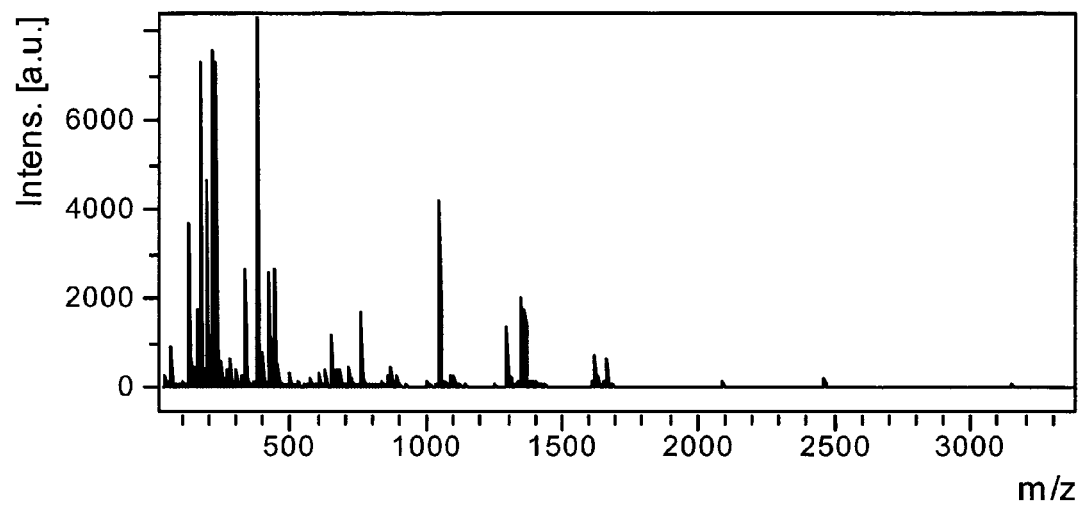
FIGS. 4a and 4b show two mass spectra of a time-of-flight mass spectrometer with axial injection.

FIG. 4a represents a mass spectrum measured in a time-of-flight mass spectrometer with axial injection when the intensity distribution with intensity spots shown in FIG. 3 is used for the MALDI process. The MALDI sample here is produced with a thin layer preparation. Contrary to widely-held opinion, a signal-intensive mass spectrum with good resolution and good signal-to-noise ratio, is obtained. In FIG. 4a, the relative frequency of the detected ions is plotted on the ordinate against their mass-to-charge ratio (m/z), which extends along the abscissa to 3,400 atomic mass units. The mass spectrum in FIG. 4a is a sum spectrum resulting from a sequence of laser pulses when the sample (221) on an area with an edge length of 150 micrometers is completely used up. With the intensity distribution with intensity spots, this requires that the grid-shaped mask (203) or the sample support (222) is shifted.

Figure 4B:
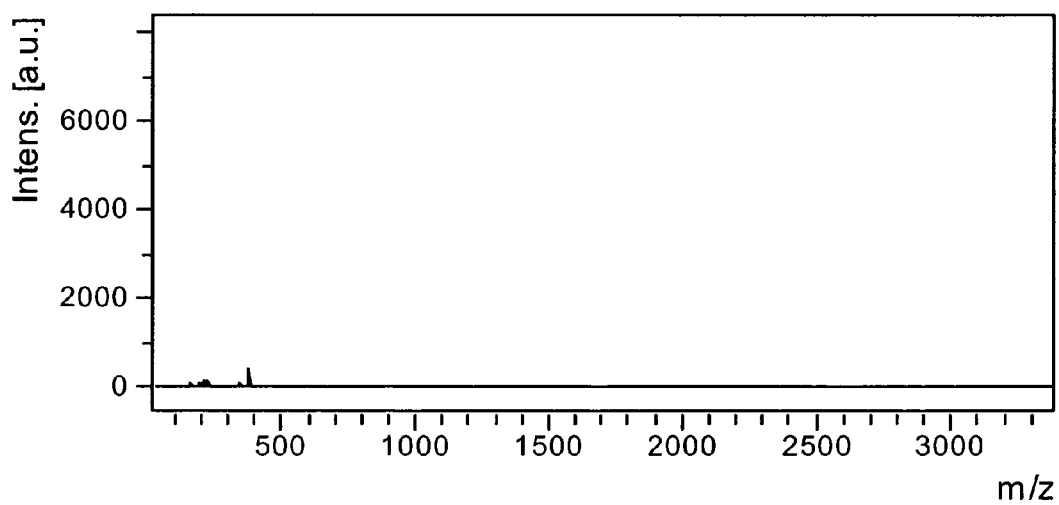

If the grid bars of the grid-shaped mask (203) are removed and only the square aperture is imaged, the mass spectrum in FIG. 4b is obtained, where an unused point on the sample (221) is used, but the settings of the laser system are otherwise kept constant. In this case, the intensity on the sample (221) is almost spatially homogeneous because the half-width of the Gaussian laser beam (202) is considerably larger than the edge length of the aperture. Compared to the spatially homogeneous intensity distribution, the intensity distribution with intensity spots provides an ion signal which is typically five to ten times as large in the whole measuring range, even though the maximum intensity on the sample (221) is the same in both cases. With the grid-shaped mask (203), the energy on the sample (221) is even less because the mask is not transparent at the grid bars. Compared to the mass spectrum in FIG. 4b, the signal-to-noise ratio and the mass resolution in FIG. 4a are improved by a factor of around five to six.

If the energy of the laser pulses is varied, a comparison of the measured mass spectra shows that the optimized ion signal of the intensity distribution with intensity spots is larger by a factor of at least two than the optimized ion signal of the homogeneous intensity distribution for analyte ions in the whole measuring range. Since the ion signal is obtained from the same sample volume, this indicates that the ionization efficiency of the MALDI process is at least doubled by the intensity spots. If both the spatially homogeneous intensity distribution and the intensity distribution with the intensity spots are optimized with respect to mass resolution and signal-to-noise ratio, then these two parameters are also improved by at least a factor of two. Moreover, for the intensity distribution with intensity spots, the optimum region with high ionization efficiency, good resolution and good signal-to-noise ratio is greatly extended, and hence the mass spectrometric analysis is very robust in relation to the energy of the laser pulse.

Figure 5:
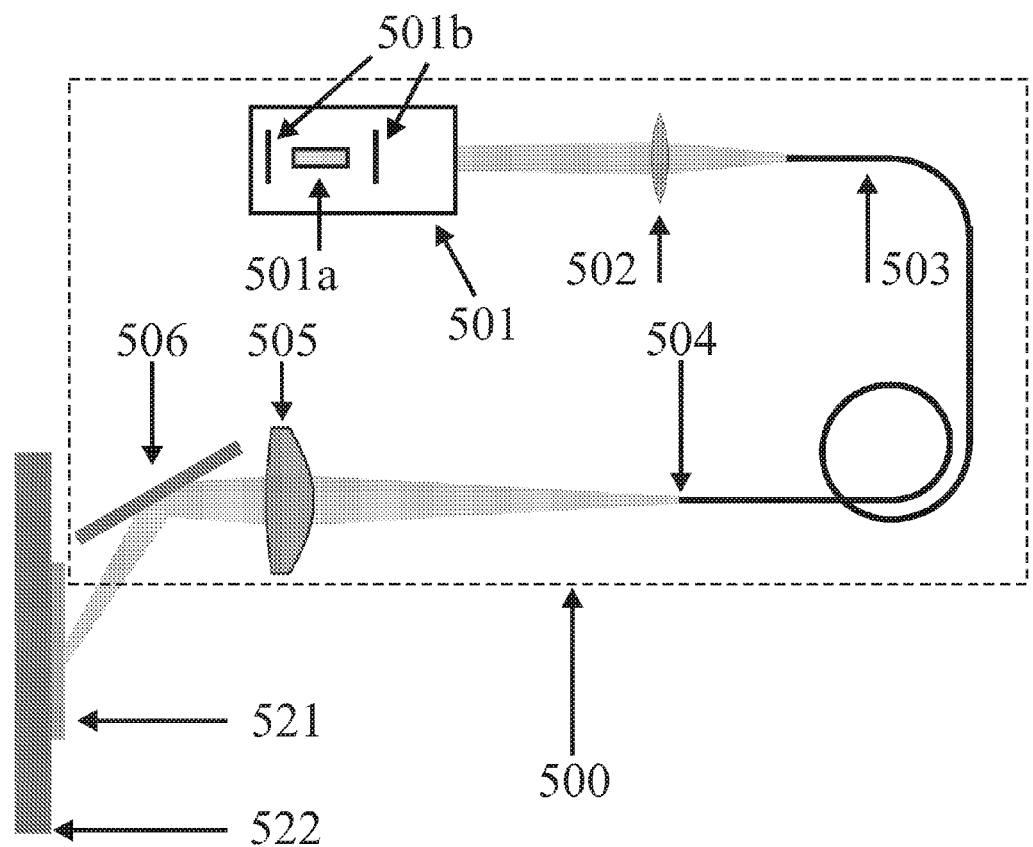
FIG. 5 shows the schematic representation of a laser system (500) according to the invention, in which the intensity in the beam profile is spatially modulated by a multimode fiber (503). The laser system (500) generates a spatially modulated intensity distribution on the sample (521)

FIG. 5 shows a second embodiment of a laser system (500) according to the invention. A pulsed laser beam is generated in the laser unit (501, comprising a laser medium 501a and an optical resonator 501b) and coupled by the lens (502) into an optical fiber (503) (multimode fiber). The fiber output (504) is imaged onto the sample (521) by the lens (505) and the tilting mirror (506).

In contrast to the prior art, the multimode fiber (503) is not utilized to homogenize the beam profile but, according to the invention, to increase the spatial modulation of the intensity. This requires that the length of the multimode fiber (503) is chosen so that the temporal coherence of the laser beam is greater than the transmission time difference of the transverse fiber modes. In this case, the intensity distribution at the fiber output (504) is no longer given by the superimposition of the intensities of the transverse fiber modes but by the interference of the electromagnetic fields of the individual fiber modes. This interference of the fiber modes generates a spatially strongly modulated intensity distribution familiar from multiple-beam interferences as a "speckle pattern".

The imaging of the fiber output (504) generates an intensity distribution on the sample (521) which has a plurality of intensity spots which are irregularly distributed in the image of the fiber output (504) and have a half-width of less than five micrometers. As is the case in the first preferred embodiment, a spatially modulated intensity distribution on the sample (521) is still achieved even if the fiber output (504) is not located in the object plane of the image. Whereas in the laser system (200) the intensity is merely attenuated by the grid-shaped mask (203), the intensity distribution at the fiber output (504) is significantly increased at certain points compared to the intensity distribution at the fiber input. For a Nd:YAG laser the fiber length for increasing the modulation is typically less than 50 centimeters and preferably less than 30 centimeters. For a nitrogen laser, the fiber length can be much shorter owing to the lower temporal coherence.

By moving the optical fiber (503) at the fiber output (504), the lens (502), the tilting mirror (506) or the sample support (522), the spatial intensity distribution can be moved relative to the sample (521). Furthermore, the intensity distribution at the fiber output (504) can be varied by moving or bending the multimode fiber (503) or subjecting it to a mechanical stress, for example, because the interference conditions of the transverse fiber modes then change and the intensity spots at the fiber output (504) arise at other locations.

Figure 6:
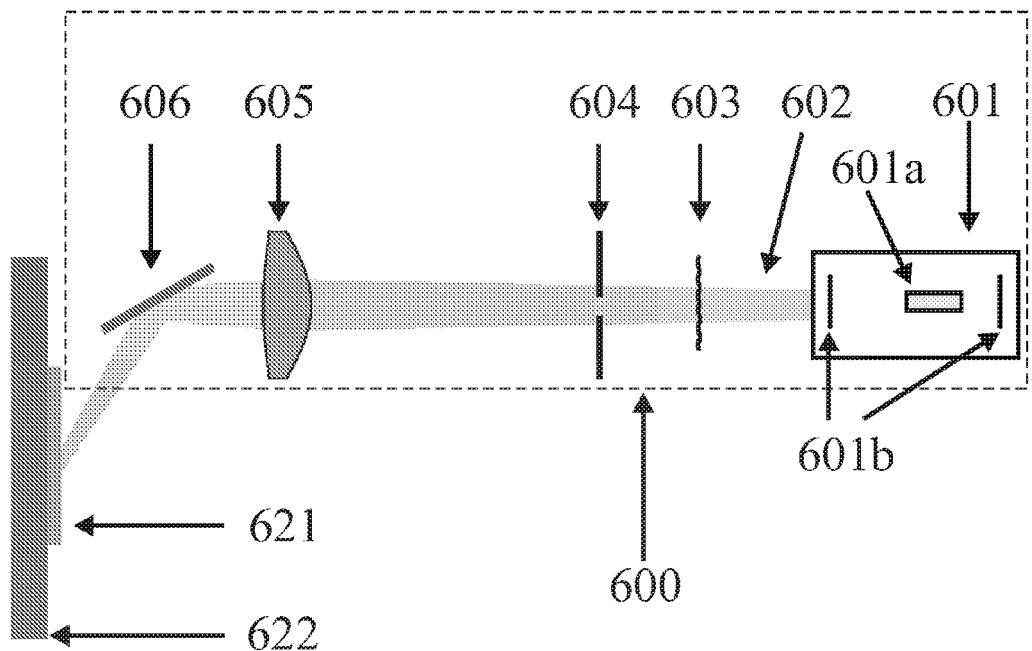
FIG. 6 shows the schematic representation of a laser system (600) according to the invention, in which the phase in the beam profile is spatially modulated by a plastic foil (603)

FIG. 6 shows a third embodiment of a laser system according to the invention (600). A pulsed laser beam is generated in the laser unit (601), and this beam illuminates a transparent plastic foil (603). The plastic foil (603) has different thicknesses at different places so that the spatial modulation of the phase in the beam profile of the laser beam (602) is increased. As is the case in the other preferred embodiments, the laser medium 601a, the set-up required to excite the laser, an optical resonator 601b and a variable attenuator are located in the laser unit (601).

If the phase-modulated laser beam (602) can propagate undisturbed, the far-field diffraction image of the plastic foil (603) occurs at a certain distance, and this image has a plurality of irregularly distributed intensity spots. The intensity spots occur as in a speckle pattern because of the random, spatially strongly modulated fluctuations in thickness of the plastic foil (603). However, intensity spots do not form initially in the far-field diffraction image, but are already present at the location of the circular diaphragm (604) in the beam profile of the laser beam (602) if the distance between the plastic foil (603) and the diaphragm (604) is sufficiently large. The inhomogeneously illuminated diaphragm (604) is imaged in reduced size by the lens (605) and the tilting mirror (606) onto the sample (621), where it generates a spatially modulated intensity distribution with intensity spots. The tilting mirror (606) spatially separates the laser system (600) from the mass spectrometer (not shown), making it easier to transfer the ions generated in the MALDI process into the mass spectrometer. Apart from the sample (621) there are other samples on the sample support (622) which are not shown.

A disadvantage of the plastic foil (603) consists in the fact that the intensity distribution on the sample (621) cannot be formed as desired because of the random thickness fluctuations of the plastic foil (603). An advantage is the ease with which many intensity spots with low half-widths can be generated. Apart from a plastic foil (603) which only modulates the phase of the beam profile, it is, of course, also possible to use a diffractive mask, which spatially modulates the intensity or the phase (or both) and thus generates a spatially modulated intensity distribution on the diaphragm (604). Instead of a diffractive mask, a reflecting surface can spatially modulate the beam profile of the laser beam equally well.

If the distance between the plastic foil (603) and the circular diaphragm (604) is large enough, the far-field diffraction image of the plastic foil (603) occurs at the location of the diaphragm (604). The diaphragm (604) defines a section of the far-field diffraction image and images it onto the sample (621) in a reduced size. With the laser system (600), any intensity distribution can be generated on the sample (621) if, instead of the plastic foil (603), a (diffractive) mask is used, where the transmission and the phase shift can be adjusted at any point of the mask. Those skilled in the art are aware that the far-field diffraction image from the two-dimensional Fourier transform of the electric field occurs behind the mask. The electric field behind the mask, and hence the far-field diffraction image at the location of the diaphragm (604) as well, is determined by the transmission and the phase shift of the mask. In practice, however, it is difficult, and often unnecessary, to adjust both the transmission and the phase shift at each point of the mask, so that in the majority of cases either the transmission or the phase shift is adjusted. There are also electrooptical chips, for example, where the phase in the beam profile can be adjusted in each pixel on the chip.

In order to use up a sample (621) as completely as possible with a sequence of laser pulses and with a high ionization efficiency, it can be necessary to change the location or the position of the spatially modulated intensity distribution or to change the spatially modulated intensity distribution itself, for example by exchanging the plastic foil (603). As already described in the first preferred embodiment, a mechanical set-up can move the plastic foil (603) or exchange it for another diffractive mask so that different spatially modulated intensity distributions are generated at the location of the diaphragm (604) and hence on the sample (621). Further possibilities consist in moving the sample support (622), the lens (605) or the tilting mirror (606) mechanically, for example, thus changing the location of the intensity distribution relative to the sample (621). If an optical system with variable focal length is used instead of the lens (604), the image ratio can be varied. As is the case with the first embodiment, oblique illumination can be compensated.

A fourth embodiment is obtained from the laser system (600) if the sample (621) is located in the rear focal length of the lens (605) and the plastic foil (603) (or a diffractive mask) without diaphragm (604) is placed in the front focal length of the lens (605). Those skilled in the art are aware, from coherent optics, that the lens (605) then generates a reduced far-field diffraction image on the sample (621) in the rear focal plane. If an optical system with variable focal length is used instead of the lens (604), the far-field diffraction image on the sample (621) can be enlarged or reduced.

Figure 7:
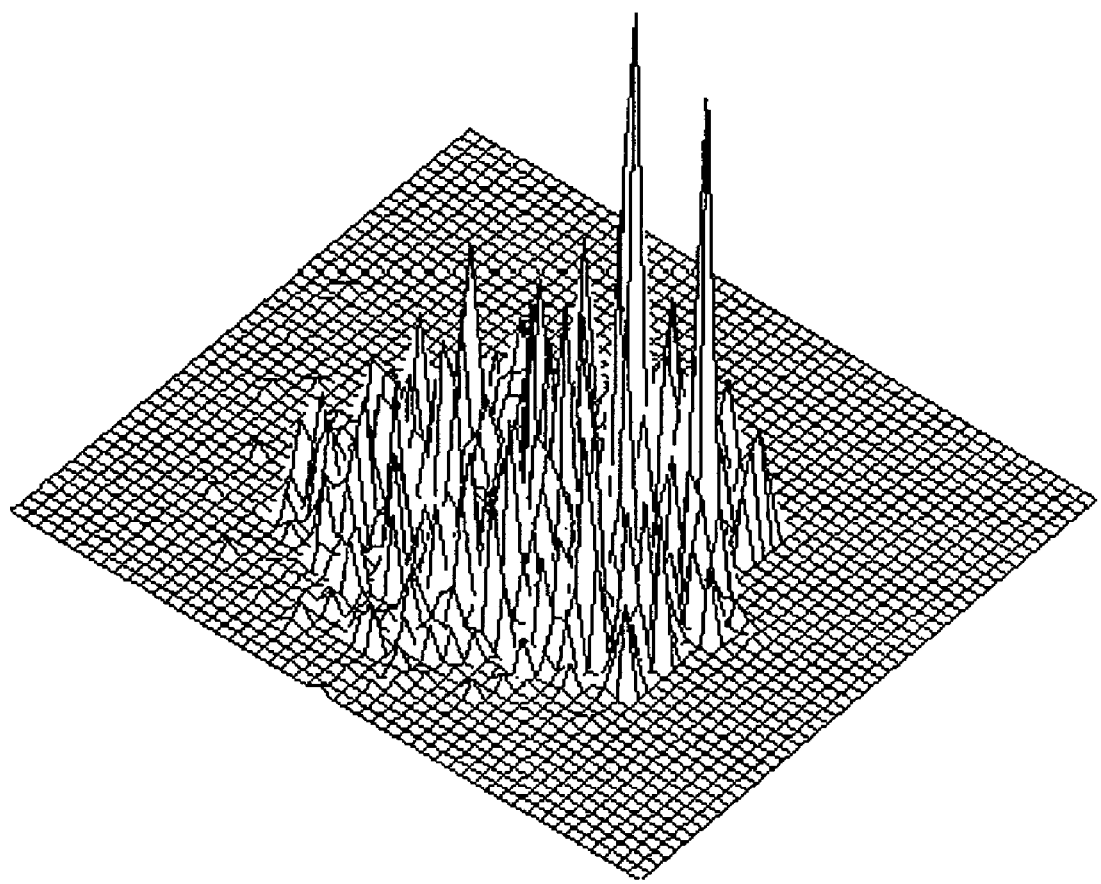
FIG. 7 illustrates an intensity distribution measured on the sample generated by the laser system of FIG. 6 with the help of the plastic foil and which has numerous individual irregularly distributed intensity spots.

FIG. 7 shows a measured intensity distribution which the laser system according to the invention (600) generates on the sample (621). The laser used here is a frequency-tripled, pulsed Nd:YAG laser with a wavelength of 355 nanometers and a pulse duration of around 3 nanoseconds and having a Gaussian beam profile. The circular diaphragm (604) has a diameter of 375 micrometers, and the lens (605) and the tilting mirror (606) reduce its image on the sample (621) fivefold. Without the plastic foil (603), the Gaussian beam profile of the laser beam (602) has a half-width of around 4 millimeters at the location of the diaphragm (604), so that the illumination of the diaphragm (604) is spatially homogeneous to a good approximation. The effect of the plastic foil (603) is that the intensity distribution, which is spatially almost homogeneous, additionally has a plurality of irregularly distributed intensity spots at the location of the diaphragm (604). On the sample (621) these intensity spots have a half-width of less than five micrometers. Owing to the limited optical resolution of the measuring set-up, the half-width can also be much less than five micrometers. In the intensity spots the intensity is considerably increased compared to the homogeneous intensity distribution without the plastic foil (603). The degree of modulation of the intensity spots is more than ⅘ in the majority of cases.

Figure 8A:
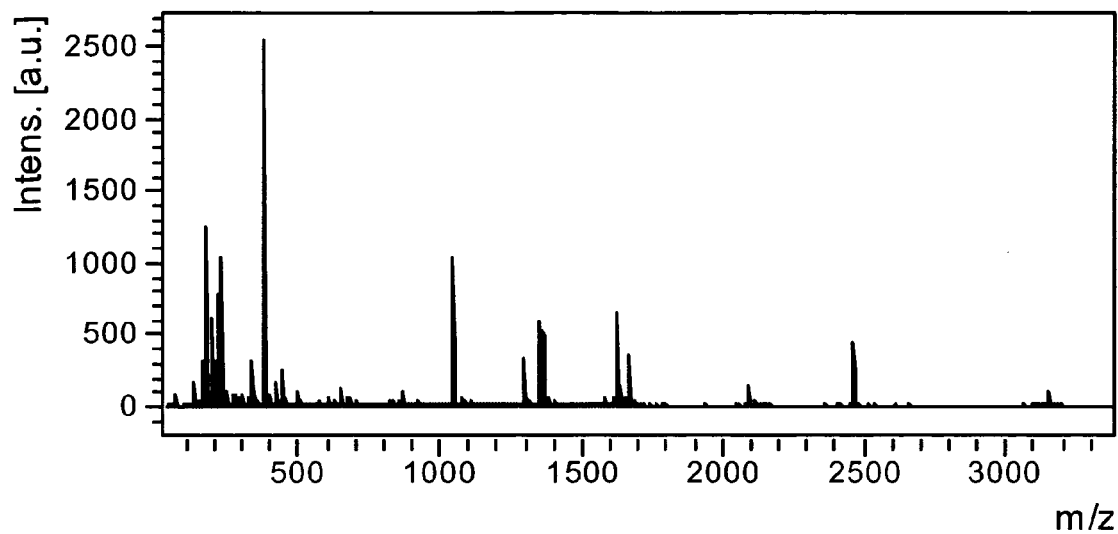
FIGS. 8a and 8b show two mass spectra of a time-of-flight mass spectrometer with axial injection, more precisely for the two intensity distributions which the laser system of FIG. 6 generates with and without plastic foil on the sample for the same laser settings.
Figure 8B:
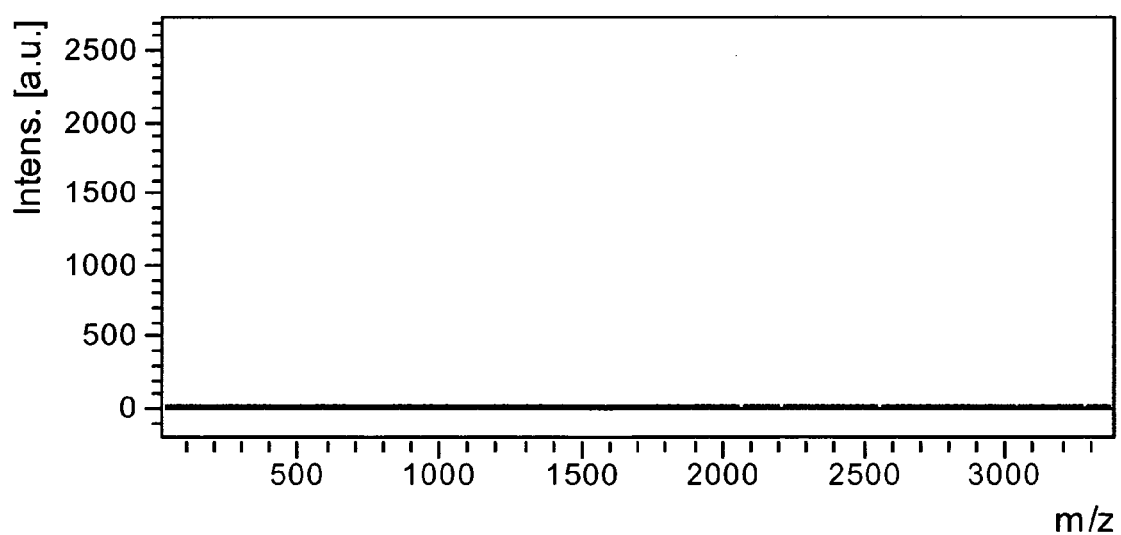

FIG. 8a represents a mass spectrum measured in a time-of-flight mass spectrometer with axial injection when the intensity distribution with randomly distributed intensity spots shown in FIG. 7 is used for the MALDI process. The sample (621) is produced here with a thin layer preparation. In FIG. 8a, the relative frequency of the detected ions is plotted on the ordinate against their mass-to-charge ratio (m/z), which extends along the abscissa to 3400 atomic mass units. FIG. 8a shows a signal-intensive mass spectrum which results from the sum of some 30 individual mass spectra and has a good resolution and a high signal-to-noise ratio. If the plastic foil (603) is removed from the laser system (600), no ion signal can be generated on a new, unused part of the sample (see FIG. 8b). The plastic foil (603) causes the intensity on the sample (621) in the intensity spots to be increased considerably. However, the energy in the spatially modulated intensity distribution on the sample (621) is lower because the plastic foil (603) partially absorbs and scatters the energy of the laser pulses. If an intensity distribution on the sample (621) exhibits a plurality of intensity spots then, compared to a spatially homogeneous intensity distribution, less energy is required in the laser pulses to generate analyte ions in the MALDI process.

Figure 9:
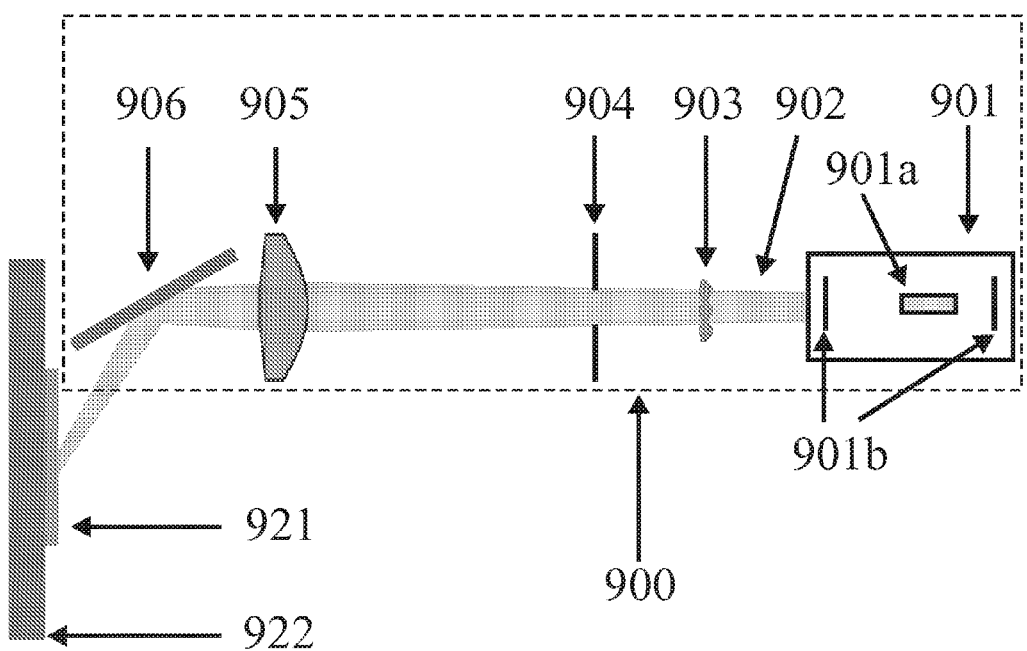
FIG. 9 shows the schematic representation of a laser system according to the invention (900), in which the phase in the beam profile is modulated by a lens array (903). The laser system (900) generates numerous spatially separate individual foci on the sample (921)

FIG. 9 shows a fifth preferred embodiment of a laser system (900) according to the invention. In the laser unit (901), a pulsed laser beam is generated which illuminates a two-dimensional array of lenses (903). This lens field (903) increases the spatial modulation of the phase in the profile of the laser beam (902). The lenses of the lens field (903) generate individual, spatially separate foci at the location of the diaphragm (904), and these foci are imaged onto the sample (921) in reduced size by the lens (905) and the tilting mirror (906). As is the case in the other preferred embodiments, the laser medium 901a, the set-up required to excite the laser, an optical resonator 901b and a variable attenuator are located in the laser unit (901).

The plurality of spatially separate foci creates an intensity distribution comprising many intensity spots on the sample (921). The half-widths of the intensity spots here are preferably less than fifty micrometers, and it is particularly preferred if they are less than twenty micrometers, but they can also be less than five micrometers and even less than one micrometer. The degree of modulation is preferably greater than $3/10$, and it is particularly preferred if it is greater than $1/2$, but it can also be greater than $4/5$.

With the lens field (903), diffraction effects occur which are fundamentally different to the geometric optics. The so-called Talbot effect is thus observed where the laser beam (902) is focused in more than one plane and the number of single foci in these planes is greater than the number of lenses in the lens field (903). The Talbot effect can be used to vary the surface density and the number of intensity spots on the sample (921).

Figure 10:
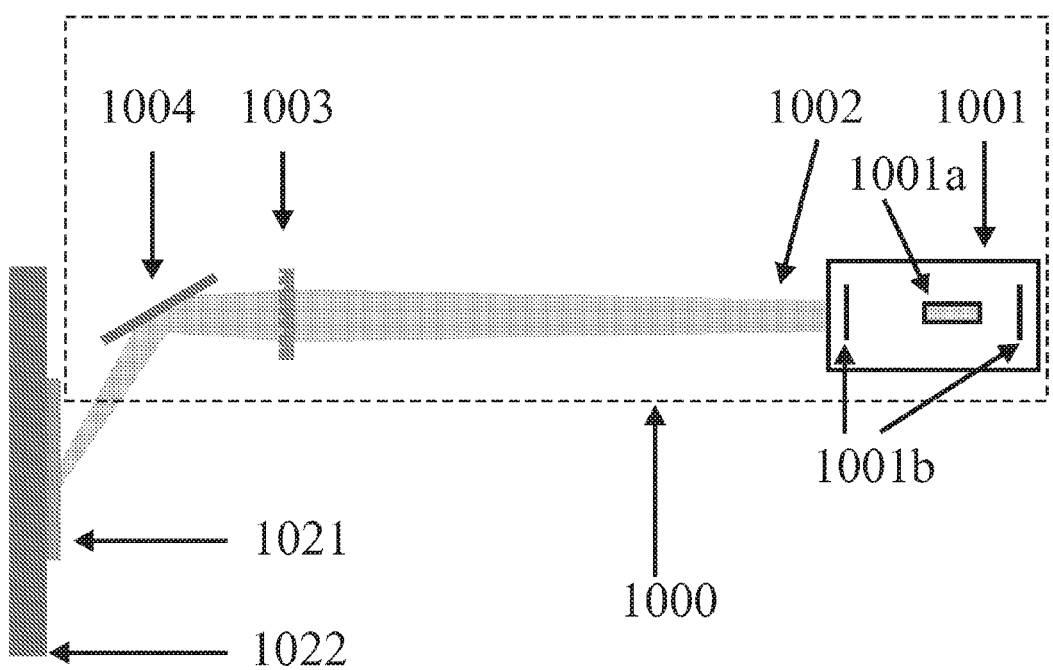
FIG. 10 shows the schematic representation of a laser system according to the invention (1000), in which the intensity and the phase in the beam profile are modulated by means of a diffractive optical element (1003). The laser system (1000) generates a spatially modulated intensity distribution on the sample (1021)

781 FIG. 10 shows a sixth embodiment of a laser system (1000) according to the invention. A pulsed laser beam is generated in the laser unit (1001) comprising a laser medium 1001a and an optical resonator 1001b) which illuminates a diffractive optical element (DOE) (1003), which can increase the spatial modulation of both the intensity and the phase in the beam profile of the laser beam. As those skilled in the art are aware, diffractive optical elements can even be used without additional refracting or reflecting optics in order to generate a spatially modulated intensity distribution with intensity spots or intensity edges on the sample (1021). By configuring the transmission or the phase shift at each individual point of the diffractive optical element (1003), a regular grid of intensity spots or intensity edges can be generated from a Gaussian beam profile, for example. The optical design of the diffractive optical element (1003) determines the number, the half-width and the degree of modulation of the intensity spots and the intensity edges; it can even compensate the oblique illumination of the sample (1021). With an energy attenuator it is possible to adjust the intensities both in the intensity spots and intensity edges and in the regions in between. By mechanically exchanging the diffractive optical elements it is possible to generate different spatial intensity distributions on the sample (1021).

To those skilled in the art it will be apparent that, in addition to the embodiments shown, there are a large number of further embodiments of laser systems with which a spatially modulated intensity distribution with intensity spots or intensity edges can be generated on a MALDI sample. It is thus possible, for example, to shape the laser beam in the optical resonator in such a way that the beam profile is already spatially inhomogeneous in the optical resonator. A further possibility consists in generating several spatially separate partial beams from one laser beam, for example with beam splitters or diffractive optical elements. The partial beams can be focused onto various points on the sample or be made to interfere on the sample, as occurs in a Michelson interferometer, for example. In both cases, a spatially modulated intensity distribution arises on the sample. In a laser system according to the invention, not only can a laser beam be split, laser beams can also be generated in more than one laser medium.

With knowledge of the invention, those skilled in the art can design further embodiments of laser systems according to the invention.

What is claimed is:

1. Laser system for the ionization of a sample by matrix-assisted laser desorption in mass spectrometric analysis, wherein the laser system incorporates a beam influencing device outside a laser medium which increases the spatial modulation of a laser beam and generates an intensity distribution of laser light that impinges on the sample and causes desorption, wherein the intensity distribution comprises more than one intensity spot or at least one intensity edge or a mixture of both.

2. Laser system according to claim 1, wherein the beam influencing device is located within an optical resonator.

3. Laser system according to claim 1, wherein the beam influencing device is located between an optical resonator and the sample.

4. Laser system according to claim 1, wherein the beam influencing device consists of an optical fiber which is less than fifty centimeters long.

5. Laser system according to claim 1 wherein the degree of modulation is greater than $3/10$ for one part of the intensity spots or the intensity edges or for all intensity spots or intensity edges.

6. Laser system according to claim 1, wherein the half-width for one part of the intensity spots or the intensity edges or for all intensity spots or intensity edges is less than 20 micrometers.

7. Laser system according to claim 1, wherein the intensity distribution at the location of the sample is partially or completely adjustable.

8. Laser system according to claim 1, wherein the laser beam consists of a sequence of laser pulses.

9. Laser system according to claim 8, wherein the intensity distribution of at least two laser pulses at the location of the sample is different.

10. Laser system according to claim 1, wherein the spatial distribution of the intensity spots and/or the intensity edges at the location of the sample is irregular.

11. Laser system according to claim 1, wherein the intensity spots and/or the intensity edges at the location of the sample form a grid which is spatially regular.

12. Laser system according to claim 1, wherein analyte ions generated in individual points or in individual regions can be detected separately with a mass spectrometer.

13. Method for the ionization of a sample by matrix-assisted laser desorption in mass spectrometric analysis, wherein the sample is produced with analyte molecules, the analyte molecules are ionized with a laser system according to claim 1, and the ionized analyte molecules are measured mass spectrometrically.

14. Laser system for the ionization of a sample by matrix-assisted laser desorption in mass spectrometric analysis, comprising a plurality of laser mediums or at least one beam splitter for generating a plurality of laser beams, which are spatially recombined at the sample and wherein the intensity distribution of laser light that impinges on the sample and causes desorption, comprises more than one intensity spot or at least one intensity edge or a mixture of both.

15. A method for mass spectrometric analysis, comprising
(a) providing a MALDI sample with analyte molecules on a sample support;
(b) generating laser light in a laser medium;
(c) increasing the spatial heterogeneity of the laser light outside the laser medium;
(d) generating an intensity distribution of laser light that impinges on the MALDI sample on the sample support and causes desorption, wherein the intensity distribution comprises more than one intensity spot and/or at least one intensity edge;
(e) ionizing the analyte molecules of the MALDI sample; and
(f) measuring the ionized analyte molecules mass spectrometrically.

16. A method for mass spectrometric analysis, comprising
(a) providing a MALDI sample with analyte molecules on a sample support;
(b) generating a plurality of laser beams, wherein the laser beams are generated in a plurality of laser mediums and/or by splitting at least one laser beam;
(c) recombining the laser beams at the MALDI sample on the sample support, wherein the intensity distribution of laser light that impinges on the MALDI sample on the sample support and causes desorption, comprises more than one intensity spot and/or at least one intensity edge;
(d) ionizing the analyte molecules of the MALDI sample; and
(e) measuring the ionized analyte molecules mass spectrometrically.

17. A method according to claims 15 or 16, wherein at least one intensity spot or intensity edge or parts of both has a degree of spatial modulation greater than $3/10$.

18. A method according to claims 15 or 16, wherein at least one intensity spot or intensity edge has a half-width of less than 20 micrometers.

19. A method according to claims 15 or 16, wherein laser light at the MALDI sample on the sample support has a spatially irregular intensity distribution.

20. A method according to claims 15 or 16, wherein laser light at the MALDI sample on the sample support has a spatially regular intensity distribution.

21. A method according to claims 15 or 16, wherein laser light at the MALDI sample on the sample support comprises a sequence of laser pulses.

22. A method according to claim 21, wherein a position of spatially modulated intensity distributions relative to the MALDI sample on the sample support is changed during the sequence of laser pulses.

* * * * *